W. H. TILSON.
CUTTING MECHANISM FOR CORN HARVESTERS.
APPLICATION FILED DEC. 12, 1911.

1,028,799.

Patented June 4, 1912.
2 SHEETS—SHEET 1.

W. H. TILSON.
CUTTING MECHANISM FOR CORN HARVESTERS.
APPLICATION FILED DEC. 12, 1911.

1,028,799.

Patented June 4, 1912.
2 SHEETS—SHEET 2.

Witnesses

W. H. Tilson  Inventor by C. A. Snow & Co.
Attorneys

UNITED STATES PATENT OFFICE.

WILLIAM H. TILSON, OF PLAINVIEW, TEXAS.

CUTTING MECHANISM FOR CORN-HARVESTERS.

1,028,799.      Specification of Letters Patent.      Patented June 4, 1912.

Application filed December 12, 1911. Serial No. 665,354.

*To all whom it may concern:*

Be it known that I, WILLIAM H. TILSON, a citizen of the United States, residing at Plainview, in the county of Hale and State of Texas, have invented a new and useful Cutting Mechanism for Corn-Harvesters, of which the following is a specification.

The present invention relates to cutting mechanism for corn harvesters, the primary object of the invention being the provision of a novel form of cutting means in which the cutting of the stalks as the same are fed to the harvester by a plurality of revoluble fingers is made more positive, the present cutting mechanism being especially adaptable to be used in connection with the corn harvesting machine shown in applicant's Patent No. 927,613 granted to him July 13, 1909.

A further object of the present invention is the provision of a rotary shaft driven by the traction wheels of the harvesting machine and carrying a plurality of stalk engaging members revolving to feed the stalks toward a stationary cutting blade which is provided with cutting edges, V-shaped in elevation, so as to provide a pocket for the reception of the stalk, a reciprocatory cutting blade being disposed across the path of the apex of the cutting edges of the stationary blade, and operably connected to the rotary shaft carrying the feeders or fingers, the same being actuated by a cam and pin mechanism so as to have imparted thereto the desired reciprocation to assist the stationary blade in severing the stalks while the fingers feed the stalks toward the respective blades.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
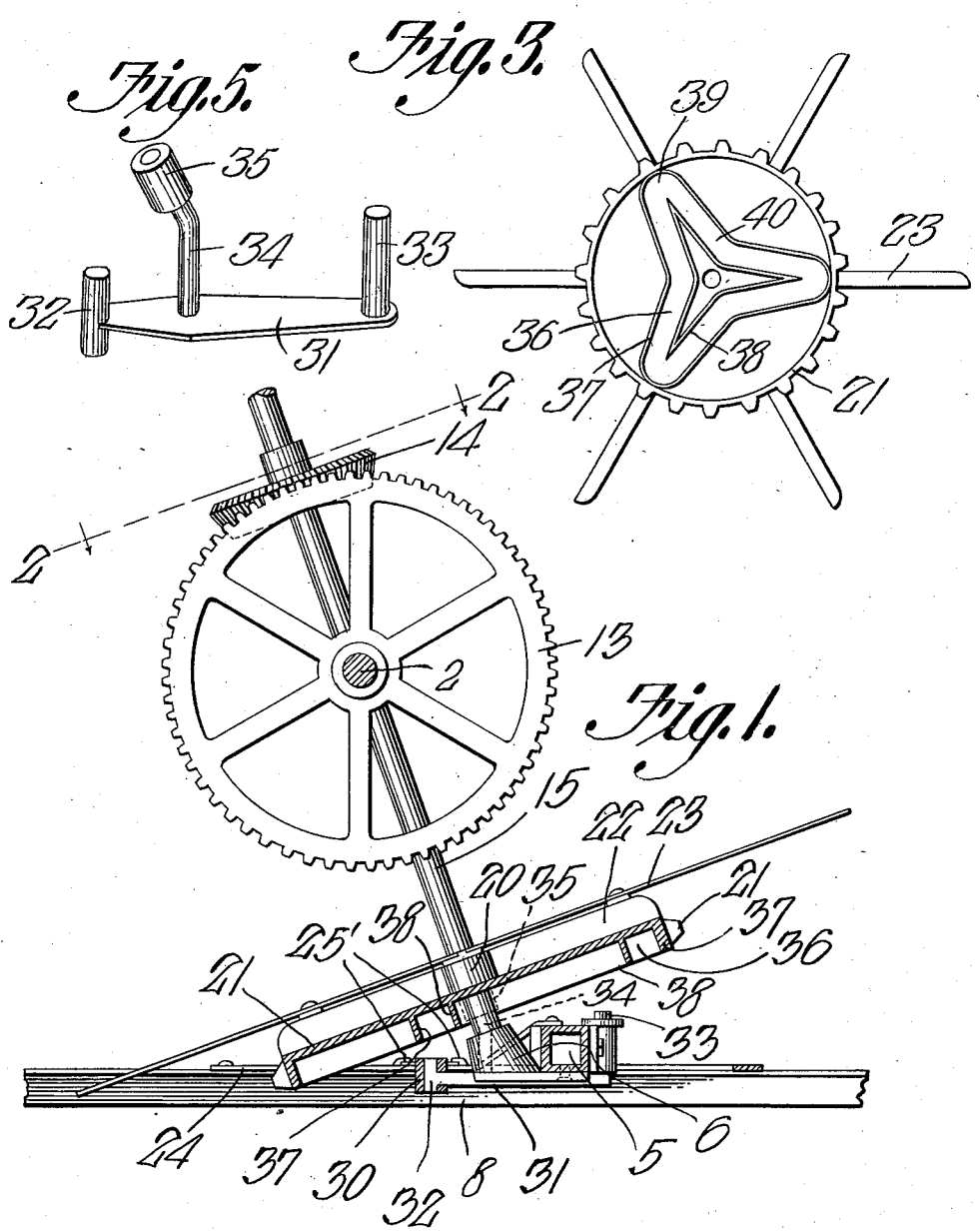
Figure 2:
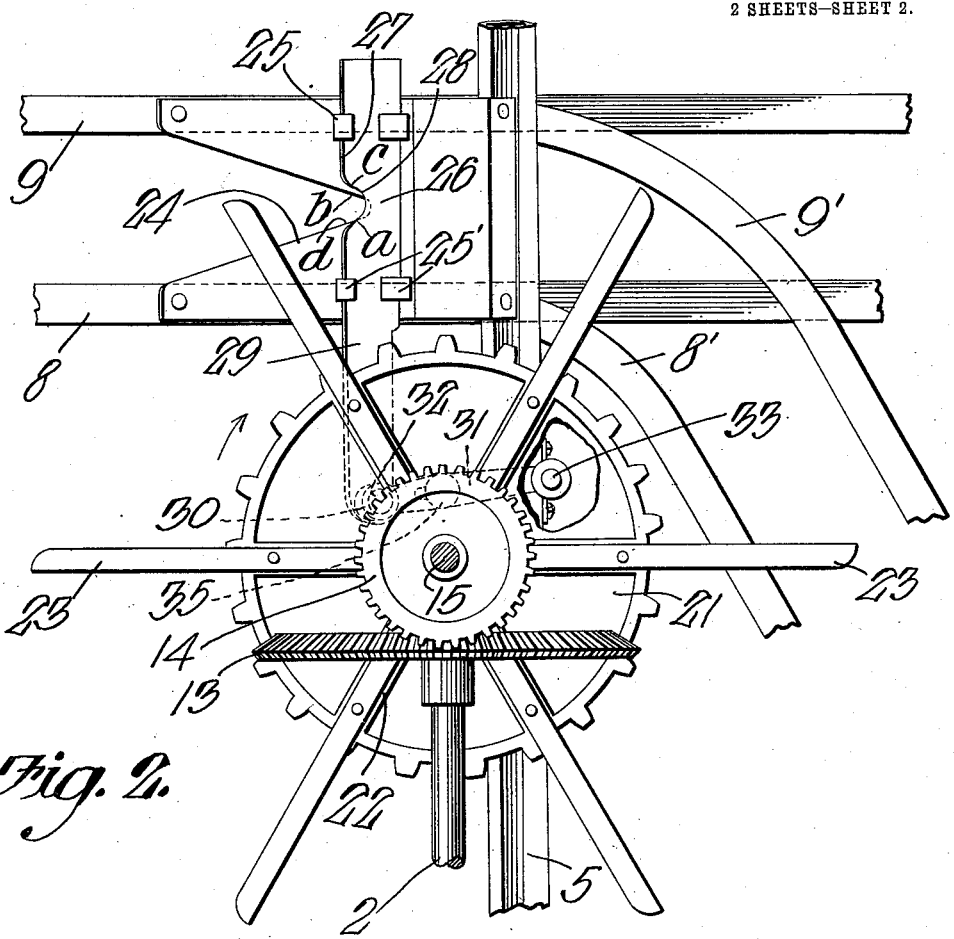
Figure 4:
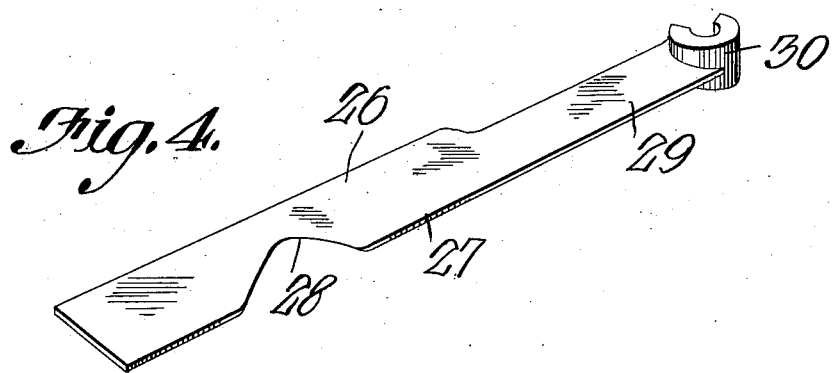

In the drawings Figure 1 is a vertical section of the main upstanding shaft for actuating the feeding fingers and reciprocatory blade with a portion of the adjacent parts of the corn harvesting machine. Fig. 2 is a section taken on line 2—2 of Fig. 1 looking in the direction of the arrow. Fig. 3 is a bottom plan view of the reciprocatory blade actuating cam and the bracket carrying the feeding fingers. Fig. 4 is a detail perspective view of the reciprocatory blade. Fig. 5 is a perspective view of the lever which is pivoted to coact with the cam to operate the reciprocatory blade.

Referring to the drawings, the main structure of the frame is composed similarly to the main structure shown in the above mentioned patent being provided with a hollow forward beam 5, rectangular in cross section, and carrying the journal bearing 6 for the reception of the lower end of the angularly disposed main shaft 15. Connected to the said beam 5 are the short directing bars or rods 8 and 9, respectively, which are spaced apart, as clearly shown in Fig. 2, and are provided with the curved rear terminals 8' and 9' respectively, so as to provide a means for guiding the butt ends of the cut stalks toward the rear of the machine.

The main shaft 2 of the machine forms the axle of a traction wheel (not shown), its construction being identical with the structure shown in the aforementioned patent, and carrying the bevel pinion 13 which meshes at all times with the bevel pinion 14 mounted and keyed upon the shaft 15. By this means motion is properly transmitted to the shaft 15.

Keyed upon and rotatable near the lower end of the shaft 15 is a collar 20 which carries the sprocket wheel or disk 21 having formed integral upon the upper face thereof the radial ribs 22 to which are secured the respective feeding and radially disposed arms 23, the same being so disposed as to operate in the direction of the arrow Fig. 2 and guide the stalks, or more positively push the stalks as they are guided between the bars 8 and 9 to the V-shaped stationary cutter or blade 24 which is connected to the respective bars 8 and 9, as clearly shown in Fig. 2.

In order to facilitate and more positively cut the stalks as the same are moved toward the cutting apex of the blade 24, the two pairs of guiding lugs 25 and 25' are connected to the stationary blade 24 so that the reciprocatory blade 26 may be properly guided therein across the apex of the cutting edges 24, the straight edges 27 of the said blade 26 acting as a guiding means to retain the said blade within the lugs 25 and 25' and in proper alinement while the recessed cutting edge 28 formed upon the forward edge of the blade 26, is reciprocated back and forth so that one cutting portion $a$ will coact with the opposite cutting portion $b$ of the blade 24 upon the movement of the reciprocatory blade 26 outwardly, while upon the inward movement of the said blade 26 its cutting edge $c$ will coact with the cutting edge $d$ of the blade 24, thus cutting both in the outward and inward movement so as to assist in severing the stalks while held within the blade 24, the reciprocating action with the peculiar construction of the respective cutting edges of the blades 24 and 26 forming shears.

In order that the proper reciprocatory movement may be imparted to the reciprocatory blade 26, the reduced end 29 thereof is carried into close proximity to the shaft 15 so that its sleeve end 30 will receive the T-shaped end or oppositely extending studs 32 of the reciprocatory blade actuating lever 31, said lever 31 being provided with the pivoting stud 33 which is connected to the main frame of the machine to the rear of the hollow bar 5. This lever 31 is provided intermediate of its ends with the upstanding curved pin or rod 34, which carries the anti-frictional roller 35 disposed at such an angle as to fit at all times within the three pointed, star-shaped, recess 36 formed by the outer rim 37 and the inner rim 38 of the reciprocatory blade actuating cam which is carried by and formed integral with the under side of the sprocket wheel 21. By this means this construction and arrangement of cam and lever 31, it will be seen that the recessed portion 36 will actuate the lever 31 so that when the anti-frictional roller 35 is in the outer portion 39 of the recess that the blade will be in its fullest outward movement and opposite one of the fingers 23, while when the anti-frictional roller 35 is at the point 40 in the said recess, said blade will be retracted to its fullest degree and opposite the adjacent finger 23, thus the extreme portion 39 of the cam recess is disposed opposite the alternating fingers 23 with the recessed or extreme inner portion 40 of the cam recess 36 opposite the remaining alternating fingers 23. By this means the cutting action of the reciprocatory blade is coincident with the movement of the respective fingers into stalk engaging and clamping position so that the stalk is held at the apex of the V-shaped stationary blade 24 by its respective finger 23 during the main cutting action of the reciprocatory blade 26, thus giving the maximum shear cut when the pressure is greatest against the respective blades. By this means the proper cutting and shearing of the stalks is made more positive and the stalk is cut so that the lower stub end thereof may be passed freely to the rear ends 8' and 9' of the guide bars without any portion thereof being attached to the stump portion remaining in the ground. By this means there is no crowding or tendency to choke the machine during the harvesting operation.

What is claimed is:

1. A cutting mechanism for corn harvesters, having a frame, stalk guiding bars, a stationary blade disposed between said bars in the path of the stalks, a rotary shaft, a plurality of radially disposed stalk engaging arms carried by said shaft and in co-active relation with the stalk guiding bars, a reciprocatory blade disposed in co-active relation with the stationary blade, a cam carried upon the shaft, a lever having one end pivoted to the frame while the free end thereof is operably connected to the reciprocatory blade, and means carried by said lever and in engagement with the cam for reciprocating the reciprocatory blade.

2. A cutting mechanism for corn harvesters, having a frame, stalk guiding bars, a stationary blade disposed between said bars in the path of the stalks, a rotary shaft, a plurality of radially disposed stalk engaging arms carried by said shaft and in co-active relation with the guiding bars, a reciprocatory blade disposed in co-active relation with the stationary blade, a cam carried upon the shaft, a lever having one end pivoted to the frame, while the free end thereof is operably connected to the reciprocatory blade, and means carried by said lever and in engagement with the cam for reciprocating the reciprocatory blade, said stationary blade being provided with two cutting edges, while the reciprocatory blade is provided with a recessed cutting edge disposed to co-act with the cutting edges of the stationary blade to produce a shearing action upon each movement thereof.

3. A cutting mechanism for corn harvesters, having a rotary shaft, a stationary blade provided with a V-shaped cutting edge disposed in the path to be engaged by the stalks to be cut, a reciprocatory blade disposed in co-active relation with said stationary blade and provided with a recessed cutting edge for co-action with the V-shaped cutting edge of the stationary blade, a cam mounted upon the shaft and provided with a plurality of blade retracting and projecting portions, a lever operably connected to said reciprocatory blade, and an arm carried by said lever and disposed in engagement with the cam to impart reciprocation to the reciprocatory blade during the rotation of the shaft.

In testimony that I claim the foregoing as my own, I have hereto affixed my signature in the presence of two witnesses.

WILLIAM H. TILSON.

Witnesses:
  DAVID GREER,
  G. GRAHAM.

Copies of this patent may be obtained for five cents each, by addressing the "Commissioner of Patents, Washington, D. C."